United States Patent

[11] 3,617,998

[72] Inventor Nathan Freedman
West Newton, Mass.
[21] Appl. No. 837,630
[22] Filed June 30, 1969
[45] Patented Nov. 2, 1971
[73] Assignee Raytheon Company
Lexington, Mass.

[54] NOISE SIGNAL DETECTOR
7 Claims, 5 Drawing Figs.
[52] U.S. Cl..................................................... 340/5 R,
325/474, 328/165, 343/7 A
[51] Int. Cl....................................................... H04b 1/10,
H04b 11/00
[50] Field of Search.......................................... 340/3, 5, 6;
343/7 RS, 17.1; 325/473, 474, 475, 476; 328/165

[56] References Cited
UNITED STATES PATENTS
3,460,059 8/1969 Purnhagen.................. 343/7 RS X Primary Examiner—Richard A. Farley
Attorneys—Philip J. McFarland and Joseph D. Pannone ABSTRACT: A receiver for use in a system in which randomly varying target-indicating signals from a transducer are detected in the presence of noise signals which may vary in amplitude between wide limits. Advantage is taken of the fact that a moving target, upon passing through the field of a transducer, will cause the root mean square value of the power of the signals received by the transducer to rise and fall independently of the noise power. Therefore, by establishing a threshold level for detection which rises and falls with changes in the root mean square value of the noise power, the existence of target indicating signals may be deduced when such a threshold level is exceeded.

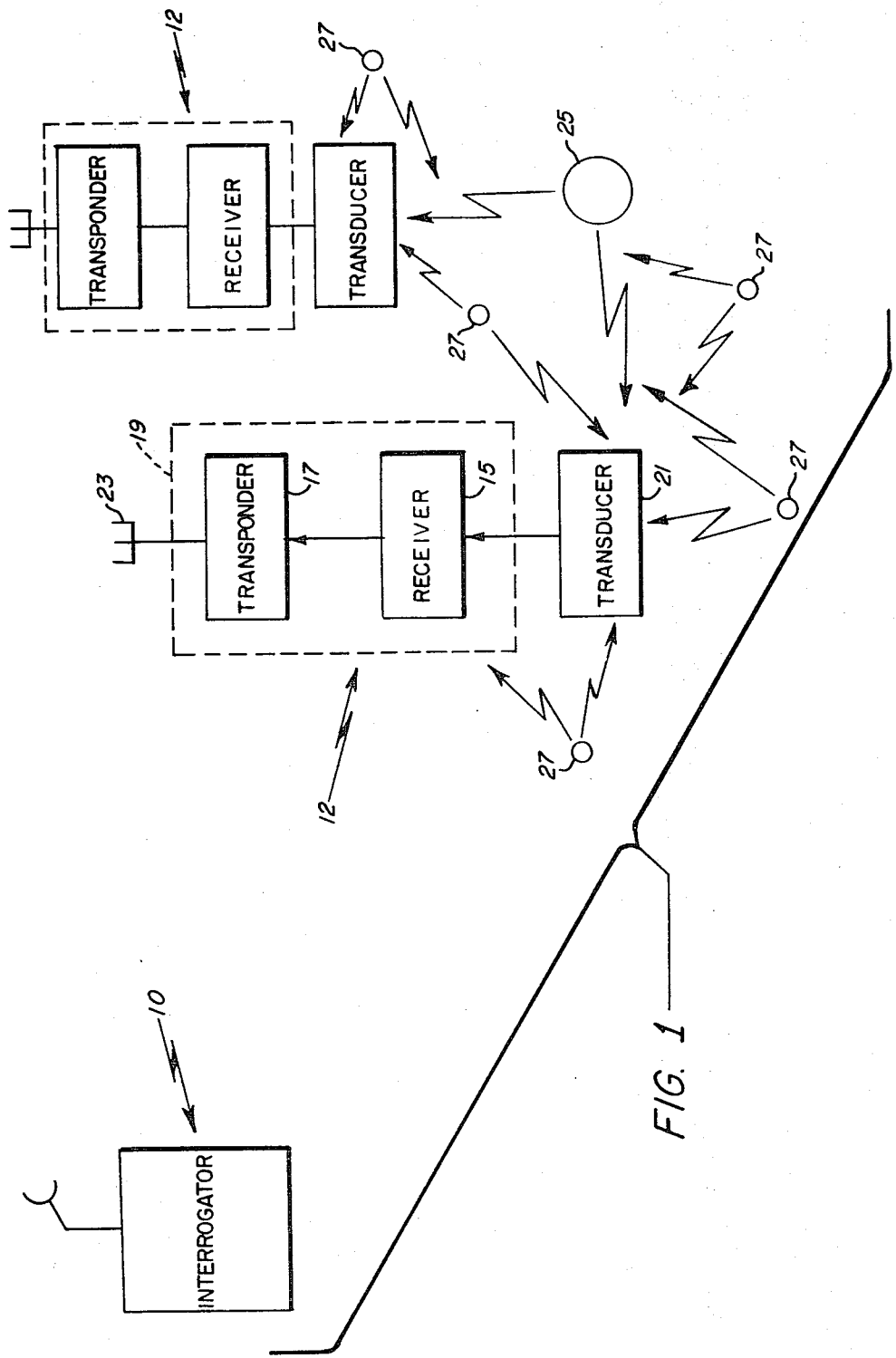

INVENTOR
NATHAN FREEDMAN

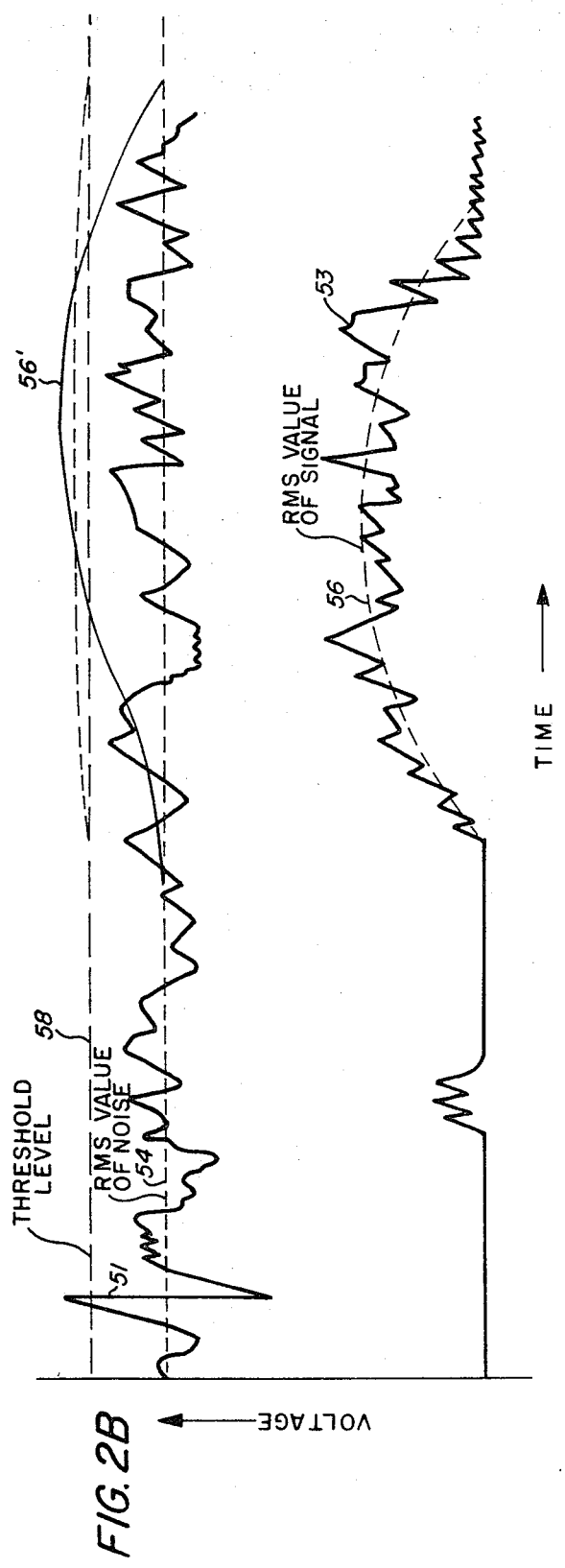
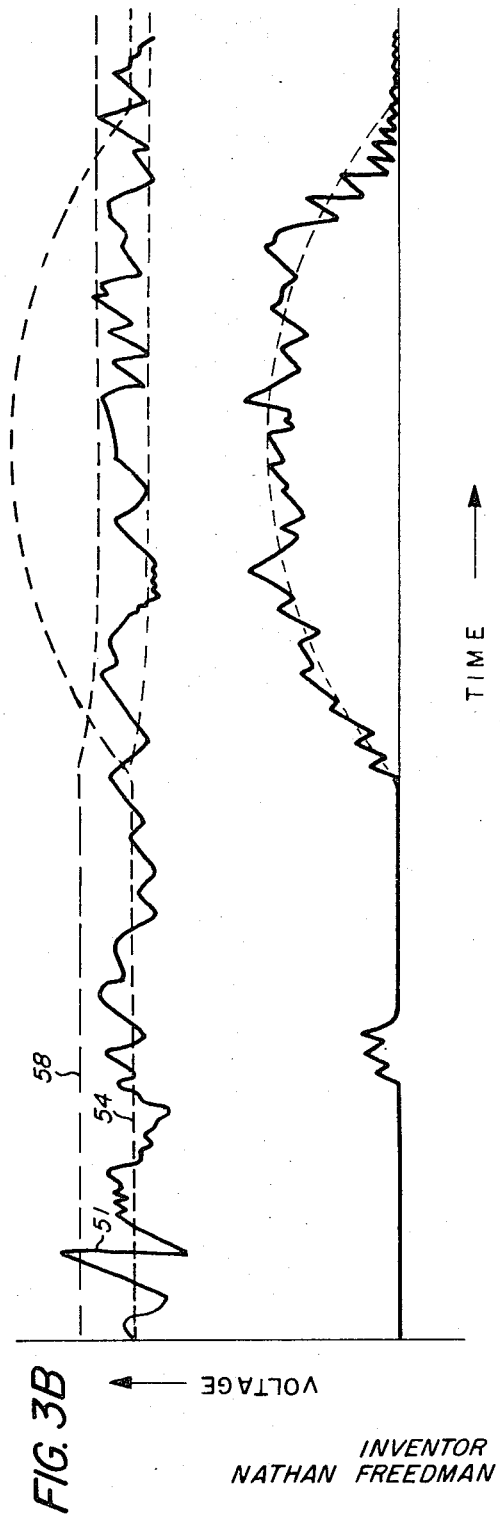
FIG. 2B
FIG. 3B
INVENTOR
NATHAN FREEDMAN

NOISE SIGNAL DETECTOR

BACKGROUND OF THE INVENTION

This invention pertains generally to signal detection apparatus and particularly to apparatus of such nature which is adapted to detecting noiselike signals in the presence of noise signals.

It is to be understood that the term "noise signal," or "noise signals," when used hereinafter should be taken to mean any unwanted energy which interferes with the ability of a receiver to detect a wanted signal. Such energy may arise from a source, or sources, inside or outside the receiver and may have any spectral width within the bandwidth of the receiver. Unless specifically noted, however, cyclical or repetitive signals which interfere with the detection process will not be considered to be noise signals. It is also to be understood that the term "noiselike signal," or "noiselike signals," should be taken to mean a signal, or signals, desired to be detected which vary randomly in frequency and/or amplitude within a spectral width which may, or may not, be coextensive with the bandwidth of the receiver. In other words, a noiselike signal is a signal which may not be detected in the presence of a noise signal using known signal enhancement or correlation techniques. It should also be understood that "detection" is used herein in the sense of recognizing the presence of a signal and not in the sense of demodulating a modulated carrier signal.

It is known in the art that noiselike signals may, under controlled conditions, be detected in the presence of noise signals. That is, a receiver may be adjusted so that its threshold level differs from the root mean square level of competing noise signals to such a degree that any signal which is greater than the minimum detectable signal of the receiver may be taken to be a desired signal. There are, however, in practical receivers of this type, two independent parameters (the root means square level of the noise signals and the threshold level) which must be considered. If the two are fixed initially, then a satisfactory compromise between the number of missed signals and false signals may be reached. If, however, the level of either changes relative to the other, then the original compromise loses its validity. As a result, the receiver either fails to detect signals it should detect or its false alarm rate becomes excessively great.

It has been common practice in the art to minimize the effect of changes in the level of noise signals by providing automatic gain control circuits in the receiver. Such a receiver is sometimes referred to as a "constant false alarm receiver" (CFAR). One form of CFAR uses the average noise level to provide an automatic gain control signal to render the receiver less sensitive when the noise level increases. Another known form of CFAR uses the average noise signal level to adjust the threshold level as the noise signal changes. Known CFAR, however, all reduce the probability of detection. That is, signals which would be detected in a conventional receiver may not be detected in a CFAR because such signals do not cross the threshold level in a CFAR.

While techniques of the kind just mentioned have been useful in situations in which operators are present to adjust the equipment according to conditions, such techniques are not too effective when unattended equipment is involved. For example, in a system such as is shown in Arsove, U.S. Pat. No. 3,344,420, issued Sept. 26, 1967, assigned to the same assignee as this application, sensing and transponding devices are scattered throughout a portion of the ocean to detect the passage of particular types of acoustic "noise generators." Each such device includes an acoustic transducer which is responsive to background sea noise as well as to desired noiselike signals from a selected type of target. When interrogated, each device transmits a signal indicative of the presence or absence of a target. It is obvious that, in such an application, means must be provided to permit operation whatever the sea state may be. In the past it has been the practice to make any required adjustments at the interrogating station. While such an approach permits operation under almost all conditions, it is not the best approach. There are two major reasons why adjustment at the interrogating station is not ideal: (1) several of the sensing and transponding devices must be interrogated simultaneously, which means that the number of such devices per unit area must be relatively high; and (2) the response of each individual one of the sensing and transducing devices to any input signal must be maintained within close limits, which means that each one must maintain its stability over long periods of time even though environmental conditions may change radically.

Therefore, it is a primary object of this invention to provide, for use particularly in unmanned sensing and transponding systems, an improved receiver which is adapted to distinguishing between background noise signals and noiselike signals desired to be detected even though the background noise signals vary greatly in magnitude.

Another object of this invention is to provide an improved receiver in which the threshold level for detection of signals remains substantially independent of the level of background noise signals.

Still another object of this invention is to provide an improved receiver which is adapted to detecting noiselike signals in the presence of background noise signals with a high degree of confidence over extended periods of time.

SUMMARY OF THE INVENTION

These and other objects of this invention are attained generally by providing, in a system for monitoring an area to determine the presence or absence of a target, a receiver in which noise signals and target indicating signals are multiplexed, in one branch circuit passing through an integrating circuit having an extremely long time constant and in another branch circuit passing through an integrating circuit having relatively short time constant. After the two types of signals pass through the integrating circuits the resulting signals are compared to produce a signal which is indicative of the difference in the RMS level of background noise signals and the RMS level of such noise signals and any signal desired to be detected. At the same time the RMS level of the background noise is used to adjust the threshold level of the receiver. When such a difference signal indicates that the amplitude of the target signal has exceeded the adjusted threshold level, a transmitter in an associated transponder is modulated so that, upon interrogation, the transmitter returns a signal indicative of the presence of target indicating signals. If the difference signal does not exceed the threshold level, the transmitter is modulated to return a signal indicative of absence of target indicating signals.

BRIEF DESCRIPTION OF THE DRAWINGS

For a more complete understanding of the invention reference is now made to the following description of the drawings in which FIG. 1 is a block diagram, simplified to illustrate the principles of this invention, showing two sensing and transponding stations in combination with an interrogating station;

FIG. 2B is a graph illustrating the operation of the receiver shown in FIG. 2A:

DESCRIPTION OF THE PREFERRED EMBODIMENTS

Figure 2A:
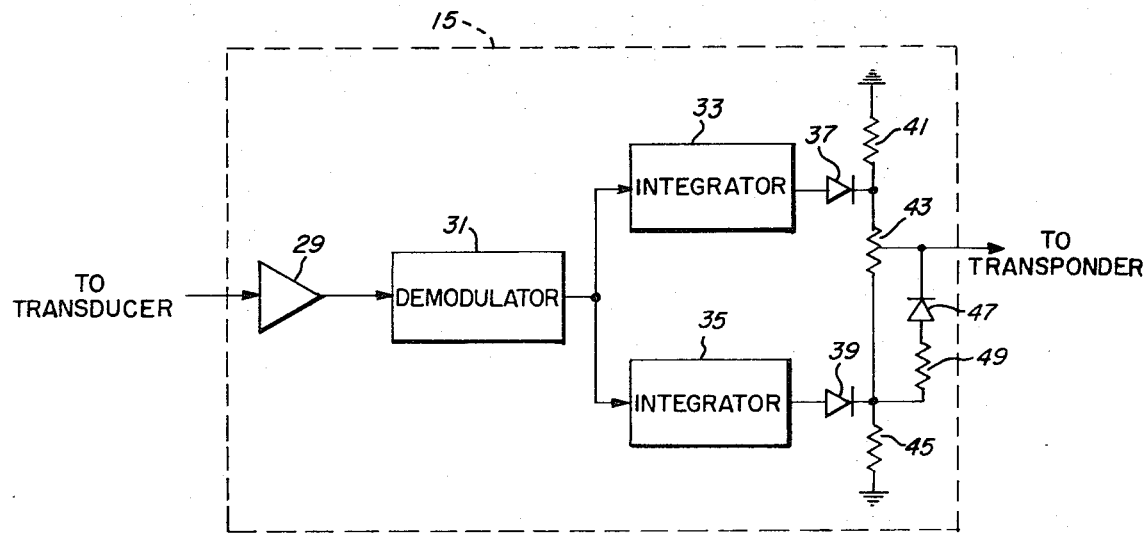
FIG. 2A is a combined block and schematic diagram of a first embodiment of the receiver shown in FIG. 1.

Referring now to FIG. 1, it may be seen that the system includes an interrogator 10 which is here simply shown in block form. It should be understood, however, that the interrogator 10 may conveniently be as shown in Arsove, U.S. Pat. No. 3,344,420. As noted previously, two sensing and transponding stations 12 are illustrated, it being understood, however, that in an operating system the number of such stations would probably be far greater. Each one of the sensing and transponding stations 12 is constructed in the same way, so only one will be described. Each such station includes a receiver 15 and a transponder 17 supported within a container 19. A transducer 21 and an antenna 23 are supported on either end of the container 19 and are electrically connected, respectively, to the receiver 15 and the transponder 17. The transducer 21 (which is here taken to be an acoustic transducer) is immersed in the ocean so as to respond to signals from a target 25 and noise sources 27. It will be recognized that, at any instant in time, there may or may not be a target within the field of the transducer 21 and that the number and distribution of noise sources 27 will be dependent primarily on the then existing sea state.

Assuming the situation in which a target 25 is within the field of the transducer 21 and that such target emits noiselike signals, the transducer 21 will convert such noiselike signals to corresponding electrical signals which are fed into the receiver 15. At the same time, noise signals from the noise sources 27 will also energize the transducer 21 and be fed into the receiver 15. The relative phase and amplitude of the noiselike signals from the target 25 and the noise sources 27 are, by definition, unpredictable. The receiver 15, for reasons to be explained in detail hereinafter in connection with the description of FIGS. 2A and 3A, will produce a first control signal for the transponder 17 when the root mean square value of the noise signals and the target signals exceeds the root mean square value of the noise signals alone. The receiver 15 will produce a second control signal for the transponder 17 when the root mean square value of the former does not exceed the root mean square value of the latter. It follows, therefore, that upon transmission of an interrogating signal from the interrogator 10, the transponder 17 produces a reply signal indicative of presence or absence of a target.

Referring now to FIG. 2A, it may be seen that the receiver 15 includes an amplifier 29 and a demodulator 31. The amplifier 29 is preferably a band-pass amplifier, the width of the band being such as to accommodate any expected target signal. The demodulator 31 preferably is a conventional linear detector, although other types of detector, as a square law detector, may be used. The output signal (which is a noise signal) from the demodulator 31 is multiplexed passing through an integrator 33 and an integrator 35. These elements preferably are conventional resistance capacitance circuits differing only in their time constants. Thus, the time constant of the integrator 33 is relatively small compared to the time constant of the integrator 35. The time constant of the latter is not critical so long as it exceeds the length of time a target is expected to be within the field of the transducer 21. The time constant of the integrator 33 also is not critical so long as it is substantially greater than the length of time of individual noise impulses from any one of the noise sources 27 or the target 25. The output of the integrator 33 is fed through a blocking diode 37 and the output of the integrator 35 is fed through a blocking diode 39 in a differencing circuit (not numbered). The differencing circuit may consist of serially connected resistors 41, 43, 45. A point on the resistor 43 is connected to the cathode of a diode 47. The anode of the diode 47 is connected through a resistor 49 to the junction of the resistors 43, 45. The output signal of the receiver is taken from the cathode of the diode 47.

The operation of the circuit may best be explained by referring to FIG. 2B along with FIG. 2A. Thus, in FIG. 2B (wherein, for clarity, exemplary noise signals 51 have been shown separated from exemplary target signals 53), it may be seen that noise signal component of the output signal of the demodulator 31 has a root mean square value, indicated by the dashed line 54, which is substantially constant during the period of time being considered, while the target signal component indicated by the dashed line 56 of such output signal has a root mean square value which rises from zero to a maximum and then decreases to zero as the target moves through the field of the transducer 21. The output signal from the integrator 35 here corresponds substantially to the root mean square value 54 of the noise signal component while the output signal from the integrator 33 is the sum of the two as indicated by dashed line 56'. The point on the resistor 43 at which the cathode of the diode 27 is connected and the relative values of the resistors 41, 45 determine the threshold level, indicated by the dashed line 58, for detection of the presence of signals to be detected by back biasing the diode 47. When the signal out of the integrator 33 rises due to signals from a target 25 above the threshold level 58, the diode 47 becomes back biased. It may be seen therefore that the impedance of the output circuit of the receiver 15 (as seen by the transponder 17) will change from one value to another depending upon the state of the diode 47.

Such a change in level is effective to control the output signal of the transponder 17, when it is interrogated.

It will be noted, further, that noise signals alone cannot cause diode 47 to change its state. Thus, as shown at the left of FIG. 2A, even though a noise signal of sufficiently high amplitude to exceed the threshold level of the diode 47 may occur at the output of the demodulator 31, such a signal has no appreciable effect on the integrated signals out of the integrators 33, 35. Consequently, isolated noise signals cannot be effective to change the state of the diode 47. It will also be noted that, having once set the threshold level of the diode 47 in any convenient manner, changes in the level of background noise signals have, at most, only a small effect on the threshold level of the diode 47.

Figure 3A:
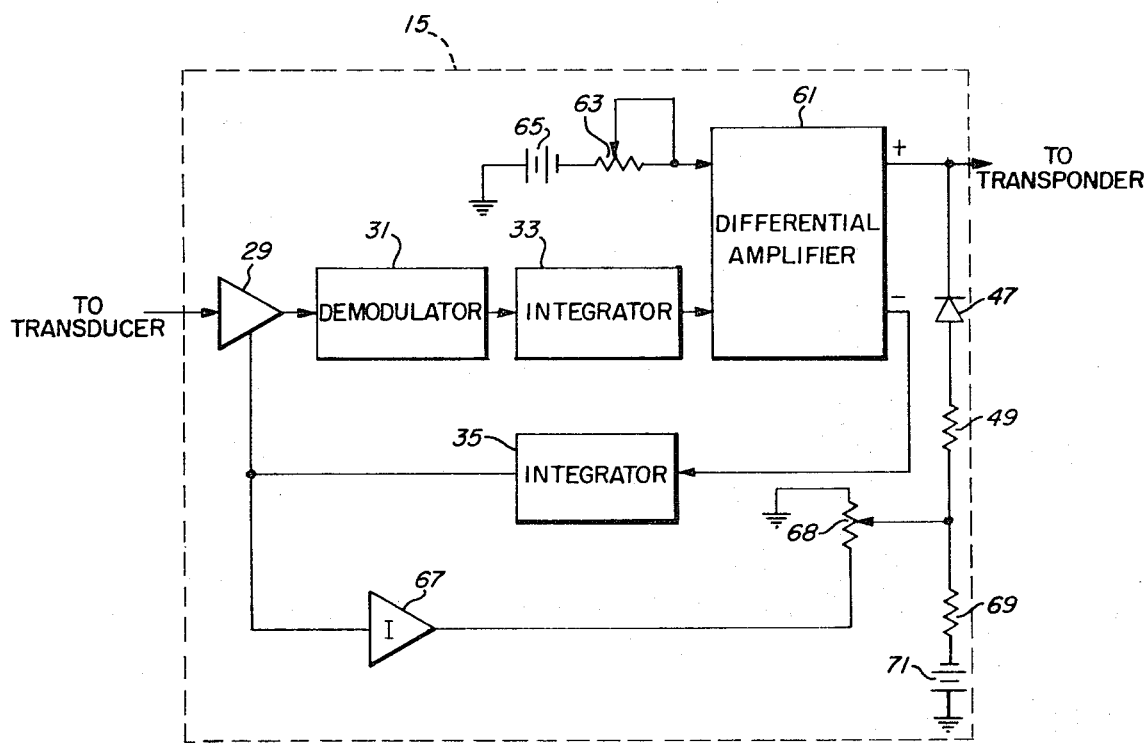
FIG. 3A is a combined block and schematic diagram illustrating an alternative preferred embodiment of the receiver shown in FIG. 1; and, FIG. 3B is a graph illustrating the operation of the receiver shown in FIG. 3A.

Referring now to FIG. 3A, it may be seen that the alternative preferred embodiment of the receiver 15 includes many of the elements of the receiver shown in FIG. 2A. Such common elements are similarly numbered. The difference in the two resides in the fact that the receiver shown in FIG. 3A incorporates feedback control signals to reduce the required dynamic range of the amplifier 29. Thus, one input terminal of a differential amplifier 61 is connected to the output of the integrator 33 while the second input terminal thereto is connected through a variable resistor 33 to a biasing source 65. The positive output terminal of the differential amplifier 61 (meaning the output terminal having a signal in phase with the signal out of the integrator 33) is connected to the cathode of the diode 47. The negative output terminal of the differential amplifier 61 is connected through the integrator 35 to the amplifier 29. It follows then, that when the amplitude of the signal from the transducer 21 into the amplifier 29 increases the gain of that element is decreased. The output of the integrator 35 is also led through an inverter 67 to a variable resistor 68. The tap on the latter is connected to the junction of a pair of resistors 49, 69, serially connected between voltage source 71 and the anode of the diode 47. It will be observed that, as the signal at the positive output terminal of the differential amplifier 61 increases, the voltage impressed on the anode of the diode 47 also increases. Adjustment of the position of the tap on the variable resistor 68 and adjustment of the tap on the variable resistor 63 sets the initial bias condition for the diode 47. It may be seen that such adjustment also determines the bias on the diode 47 as the level of background noise signals changes and that such adjustment may be made in such a manner as to maintain the threshold level of detection constant. Further, it may be seen that the voltage source 71 provides a fixed bias on the diode 47 which must be overcome by a signal out of the inverter 67. This means that small changes in the amplitude of noise signals into the amplifier 29 cannot cause the diode 47 to change its state.

Referring now to FIG. 3B, it may be seen that the operation of the circuit shown in FIG. 3A is essentially similar to the operation of the circuit shown in FIG. 2A except that, in FIG. 2B, the threshold level again indicated by the numeral 58 automatically changes to follow changes in the root mean square value of the noise component of the signals out of the demodulator 31.

From the foregoing description of two preferred receivers embodying this invention, it may be seen that the concept of converting noise signals and noiselike signals desired to be detected into root mean square signals may be implemented in other ways without departing from the concept that a temporal change in the power in a noise signal may be ascribed to the presence of a noiselike signal to be detected. For example, it is not essential to this invention that the integrators be conventional resistance capacitance circuits. Any type of integrators may be used provided only that the difference in the time constants of the circuits used by maintained as set forth hereinbefore. Further, it is not essential to this invention that the contemplated receiver be used in detecting acoustic signals. For example, this invention could be used in a system in which noiselike microwave signals are to be detected in the presence of noise signals, it being necessary only to provide appropriate circuitry signals of such character. It will also be noted that it is not essential to this invention for the threshold circuit to be incorporated in the receiver when a system such as that shown in FIG. 1 is contemplated. That is, the signals which in the illustrated embodiments are impressed upon a threshold circuit may instead be impressed directly on the transponder so that that element may transmit such signals back to a interrogator. In such a conflict it will be recognized that the receiver of the interrogator will then function in the same manner as the illustrated threshold circuits. It is felt, therefore, that this invention should not be restricted to its disclosed embodiment but rather should be limited only by the spirit and scope of the appended claims.

I claim:
1. In a system for detecting, in the presence of noise signals, noiselike signals from a transducer, a receiver comprising:
    a. amplifying means, responsive to noise signals and to noiselike signals from the transducer, for producing signals varying in time in accordance with variations in the resultant of such noise and noiselike signals;
    b. demodulating means, responsive to the signals out of the amplifying means, for producing unipolar signals varying in accordance with variations in the resultant of the noise signals and the noiselike signals;
    c. multiplexing means for dividing the unipolar signals into a first and a second signal path, the first such path including integrating means having a first time constant and the second such path including integrating means having a second time constant, the second time constant being longer than the first time constant, the first time constant being substantially greater than the duration of said noise or noiselike signals;
    d. comparator means, responsive to the unipolar signals in the first signal path and the unipolar signals in the second signal path for producing signals when the amplitude of the unipolar signals out of the first signal path exceeds the amplitude of the signal out of the second signal path; and,
    e. a threshold circuit, responsive to the signals from the comparator means, for producing output signals when the amplitude of the signals out of the comparator means exceeds the amplitude of the signals out of the second signal path by a predetermined amount.

2. A receiver as in claim 1 wherein the time constant of the integrating means in the first signal path is less than the period of time during which noiselike signals are received by the transducer and the time constant of the integrating means in the second signal path is greater than such period.

3. A receiver as in claim 2 wherein the time constant of the integrating means in the first signal path is selected to produce signals varying as the root mean square value of the resultant of the noise signals and the noiselike signals out of the demodulating means and the time constant of the integrating means in the second signal path is selected to produce signals varying as the root means square value of the portion of such resultant corresponding to noise signals.

4. In a system for detecting, in the presence of noise signals, noiselike signals from a transducer, a receiver comprising:
    a. amplifying means, responsive to noise signals and to noiselike signals from the transducer, for producing signals initially varying in time in accordance with the variations in the resultant of such noise and noiselike signals;
    b. demodulating means, responsive to the signals out of the amplifying means, for producing unipolar signals varying in accordance with the variations in the resultant of the noise signals and the noiselike signals;
    c. multiplexing means for dividing the unipolar signals into a first and a second signal path, the first such path including integrating means having a first time constant and the second such path including integrating means having a second time constant, such second time constant being longer than such first time constant;
    d. feedback means, responsive to the signals out of the integrating means in the second signal path, for controlling the gain of the amplifying means as the amplitude of such signals varies; and,
    e. a threshold circuit, responsive to the signals out of the first and the second integrating means for producing output signals when the amplitude of the signals out of the integrating means out of the first signal path exceeds the amplitude of the signals out of the second signal path by a predetermined amount.

5. A receiver as in claim 4 wherein the time constant of the integrating means in the first signal path is selected to produce signals varying as the root mean square value of the resultant of the noise signals and the noiselike signals out of the demodulating means and the time constant of the integrating means in the second signal path is selected to produce signals varying as the root means square value of the portion of such resultant corresponding to noise signals.

6. A receiver as in claim 5 wherein the feedback means includes biasing means having a fixed level for inhibiting the signals out of the integrating means from controlling the gain of the amplifying means when the amplitude of such signals is less than the level of the biasing means.

7. A receiver as in claim 6 wherein the relative amplitude of the signals out of the first and the second integrating means applied to the threshold circuit is constant.

* * * * *